(12) United States Patent  
Brooks (10) Patent No.: US 10,726,647 B2  
(45) Date of Patent: Jul. 28, 2020

(54) FAULT DETECTION SYSTEM FOR AN AGRICULTURAL MACHINE

(71) Applicant: CNH Industrial America LLC, New Holland, PA (US)

(72) Inventor: Nathan Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 477 days.

(21) Appl. No.: 15/457,130

(22) Filed: Mar. 13, 2017

(65) Prior Publication Data

US 2018/0260082 A1    Sep. 13, 2018

(51) Int. Cl.

| | |
|---|---|
| *G06F 3/048* | (2013.01) |
| *G07C 5/08* | (2006.01) |
| *B60W 50/00* | (2006.01) |
| *G06F 3/0482* | (2013.01) |
| *G06F 3/0481* | (2013.01) |
| *A01M 7/00* | (2006.01) |
| *H01H 85/20* | (2006.01) |

(52) U.S. Cl.
CPC ........... *G07C 5/0825* (2013.01); *B60W 50/00* (2013.01); *G06F 3/0482* (2013.01); *A01M 7/0042* (2013.01); *G06F 3/04817* (2013.01); *H01H 2085/208* (2013.01)

(58) Field of Classification Search
CPC .......................... G07C 5/0825; G06F 3/04817
USPC ................. 715/822, 810, 821, 835
See application file for complete search history.

(56) References Cited

U.S. PATENT DOCUMENTS

| | | | |
|---|---|---|---|
| 4,467,961 | A | 8/1984 | Coffee et al. |
| 4,514,723 | A | 4/1985 | Leal |
| 4,733,058 | A | 3/1988 | Ho et al. |
| 5,748,427 | A | 5/1998 | Yerkovich et al. |
| 7,576,635 | B2 * | 8/2009 | Bender ............... G06Q 10/06 340/292 |
| 9,236,209 | B2 | 1/2016 | Overton et al. |
| 2014/0107926 | A1 | 4/2014 | Woo et al. |
| 2015/0228435 | A1 | 8/2015 | Hudetz |
| 2017/0314803 | A1 * | 11/2017 | Jacobson ............. G06F 16/26 |

FOREIGN PATENT DOCUMENTS

| | | |
|---|---|---|
| EP | 0623943 A1 | 11/1994 |
| KR | 100258381 B1 | 6/2000 |

* cited by examiner

*Primary Examiner* — Andrey Belousov
(74) *Attorney, Agent, or Firm* — Rebecca L. Henkel; Rickard K. MeMille (57) ABSTRACT

A fault detection system for an agricultural machine is configured to display to an operator a virtual layout of fuses and/or relays for the machine in an arrangement corresponding to an actual/physical layout of the fuses and/or relays on the machine. The system can monitor for fault conditions of the fuses and/or relays, and display a location of a fuse or relay corresponding to a physical location of where the faulty fuse or relay can be found from among other fuses and/or relays. A faulty fuse and/or relay can be highlighted, such as by changing a color of the fuse and/or relay, for rapid identification. The system can also display a list providing descriptions for the fuses and/or relays to assist with fault resolution.

20 Claims, 8 Drawing Sheets

F1/K1 (20A) – STADIUM LIGHTS 1 & 6
F2/K2 (20A) – STADIUM LIGHTS 2 & 5
F3/K3 (20A) – STADIUM LIGHTS 3 & 4
F4/K4 (10A) – BEACONS
F5/K5 (20A) – BOOM LIGHTS
F6/K6 (30A) – WIPER LOW
F7/K7 (20A) – LOW BEAMS
F8/K8 (20A) – HIGH BEAMS
F9/K9 (30A) – WIPER HIGH
K10 – SPARE
K11 – SPARE
K12 – SPARE
K13 – DOOR SWITCH RELAY
K14 – WIPER FLUID RELAY
K15 – EGRESS LIGHT RELAY
F10 (10A) – SWITCHED DISPLAY POWER
F11 (10A) – SWITCHED RADIO POWER
F12 (15A) – SWITCHED DRIVELINE CNTRL PWR
F13 (10A) – RADAR POWER
F14 (20A) – AUTO STEER VALVE POWER
F15 (30A) – SWITCHED OUTLET POWER
F16 (30A) – EVAPORATOR BLOWER POWER
F17 (20A) – SEAT POWER
F18 (15A) – SWITCHED FIELD COMPUTER POWER
F19 (10A) – HVAC PRESSURE BLOWER
F20 (10A) – HVAC PRESSURE SENSOR
F21 (10A) – SWITCHED HVAC CONTROL POWER
F22 (10A) – CONSTANT HVAC CONTROL POWER
F23 (10A) – COOLER POWER
F24 (10A) – WIPER FLUID PUMP POWER
F25 (30A) – CONSTANT OUTLET POWER
F26 (10A) – CONSTANT DISPLAY POWER
F27 (10A) – POWERED MIRRORS
F28 (10A) – STEERING COLUMN
F29 (10A) – COMBINER LOGIC POWER

F1 /K1 (10A) – BOOM REST – UP LIGHTS
F2 /K2 (10A) – BOOM REST – LEFT OUT LIGHT
F3 /K3 (20A) – SPARE
F4 /K4 (10A) – BOOM REST – RIGTH OUT LIGHT
F5 /K5 (20A) – SPARE
F6 /K6 (10A) – ECM SWITCHED POWER
F7 /K7 (20A) – SPARE
F8 /K8 (20A) – SPARE
F9 /K9 (30A) – A/C CLUTCH
K10 – SPARE
K11 – SPARE
K12 – SPARE
K13 – SPARE
K14 – ENGINE AUX RELAY
K15 – SPARE
F10 (20A) – SPARE
F11 (10A) – FOAMER POWER
F12 (15A) – SENSOR POWER
F13 (25A) – PRODUCT VALVES
F14 (15A) – NODE POWER

F15 (15A) – BOOM VALVES
F16 (20A) – RAVEN NODES HIGH CURRENT POWER
F17 (15A) – SPARE
F18 (10A) – ALTERNATOR EXCITER
F19 (30A) – INJECTION HIGH CURRENT POWER #2
F20 (30A) – INJECTION HIGH CURRENT POWER #3
F21 (30A) – INJECTION HIGH CURRENT POWER #1
F22 (30A) – ECM CONTANT POWER
F23 (20A) – ISO CONSTANT POWER
F24 (10A) – ENGRESS LIGHTS
F25 (25A) – HAWKEYE HIGH CURRENT POWER #1
F26 (25A) – HAWKEYE HIGH CURRENT POWER #2
F27 (25A) – HAWKEYE HIGH CURRENT POWER #3
F28 (20A) – ENGINE AUX RELAY POWER
F29 (25A) – HAWKEYE HIGH CURRENT POWER #4

FAULT DETECTION SYSTEM FOR AN AGRICULTURAL MACHINE

FIELD OF THE INVENTION

The invention relates generally to agricultural machines such as self-propelled sprayers and, in particular, to a fault detection system for agricultural machines in which a system controller is operable to display to an HMI a virtual representation of a fuse block having a plurality of electrical fuses arranged in the physical pattern, monitor the plurality of electrical fuses for a fault condition, and upon detecting a fault condition, highlight the electrical fuse producing the fault condition.

BACKGROUND OF THE INVENTION

Agricultural machines, such as high-clearance sprayers, are getting larger and more complex to allow for increasing coverage in a single pass, which improves application efficiency. These machines often have sophisticated product delivery and other systems that are electronically controlled, with numerous fuses and relays at different locations on the machine. Some fuse and relay providers have systems for monitoring statuses of and identifying faults with their fuses and relays. However, since fuses and relays are typically arranged in different ways on a machine, an operator may not know where the faulty fuse or relay is located or what it does. A need therefore exists for an improved system which eliminates one or more of the foregoing disadvantages.

SUMMARY OF THE INVENTION

A fault detection system for an agricultural machine is configured to display to an operator a virtual layout of fuses and/or relays for the machine in an arrangement corresponding to an actual/physical layout of the fuses and/or relays on the machine. The system can monitor for fault conditions of the fuses and/or relays, and display a location of a fuse or relay corresponding to a physical location of where the faulty fuse or relay can be found from among other fuses and/or relays. A faulty fuse and/or relay can be highlighted, such as by changing a color of the fuse and/or relay, for rapid identification. The system can also display a list providing descriptions for the fuses and/or relays to assist with fault resolution.

Accordingly, an aspect of the invention can provide a fuse and relay fault detection system which visually displays where the faulty fuse or relay is located on the agricultural machine and what component or system it controls. The fuse and relay fault detection system can integrate a fuse and/or relay monitoring system into the machine and include a fault display system that gives information about the fault. The fuse and relay fault detection system can display component function and location information to the operator, corresponding to the fault. The system displays information about the fuse and/or relay that failed, including visually displaying where it is located on the sprayer and what function or component it controls.

Specifically then, one aspect of the present invention can provide a fault detection system for an agricultural machine including: a fuse block having multiple electrical fuses for protecting equipment of the agricultural machine, in which the electrical fuses are arranged in the fuse block in a physical pattern; a Human Machine Interface (HMI) having a screen; and a system controller in communication with the fuse block and the HMI. The system controller can execute a program stored in a non-transient medium operable to: (a) display to the HMI a virtual representation of the fuse block having the multiple electrical fuses arranged in the physical pattern; (b) monitor the multiple electrical fuses for a fault condition in which an electrical fuse fails to operate; and (c) upon detection of an electrical fuse producing a fault condition, highlight the electrical fuse producing the fault condition in the virtual representation of the fuse block displayed to the HMI.

Another aspect can provide a method for detecting faults in an agricultural machine having a fuse block including multiple electrical fuses for protecting equipment of the agricultural machine, in which the electrical fuses are arranged in the fuse block in a physical pattern, the method including: (a) displaying to a Human Machine Interface (HMI) having a screen a virtual representation of the fuse block having the multiple electrical fuses arranged in the physical pattern; (b) monitoring the plurality of electrical fuses for a fault condition in which an electrical fuse fails to operate; and (c) upon detecting an electrical fuse producing a fault condition, highlighting the electrical fuse producing the fault condition in the virtual representation of the fuse block displayed to the HMI.

Another aspect may provide an agricultural sprayer including: a chassis supported by multiple wheels, the chassis supporting an engine, a drive system, a lift arm assembly and an operator cab; a sprayer boom connected to the lift arm assembly; a first fuse block including multiple electrical fuses for protecting equipment corresponding to the cab, in which the electrical fuses of the first fuse block are arranged in a first physical pattern; a second fuse block including multiple electrical fuses for protecting equipment corresponding to the engine area, in which the electrical fuses of the second fuse block are arranged in a second physical pattern; a Human Machine Interface (HMI) having a touchscreen in the operator cab; and a system controller in communication with the first and second fuse blocks and the HMI. The system controller can execute a program stored in a non-transient medium operable to: (a) display to the HMI first and second virtual representations of the first and second fuse blocks having the multiple electrical fuses arranged in the first and second physical patterns, respectively; (b) monitor the multiple electrical fuses of the first and second fuse blocks for a fault condition in which an electrical fuse fails to operate; and (c) upon detection of an electrical fuse producing a fault condition, highlight the electrical fuse producing the fault condition in a corresponding virtual representation of the first or second fuse blocks displayed to the HMI.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
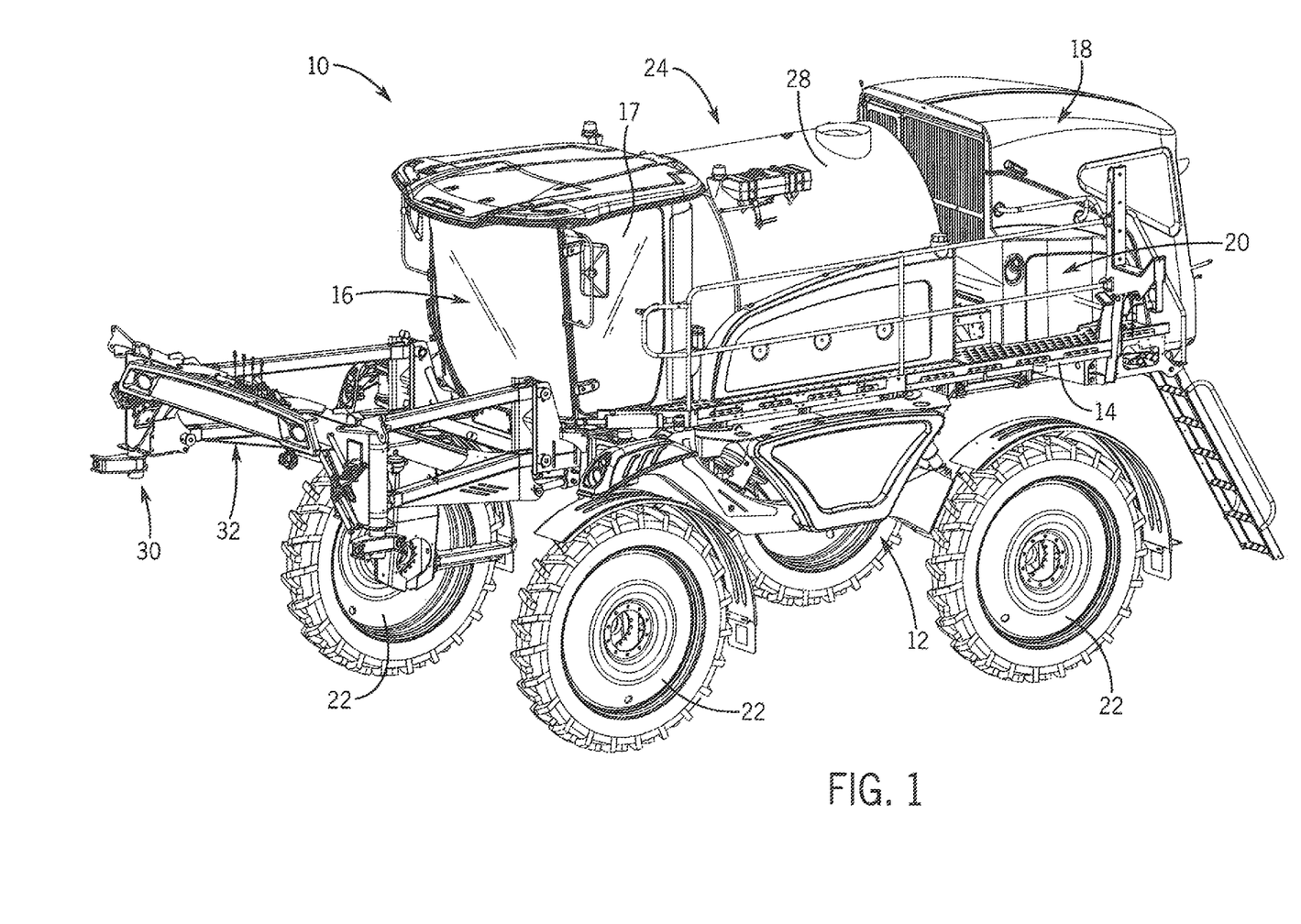
FIG. 1 is an isometric view of an agricultural machine in accordance with an aspect of the invention.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, a spray system 24, and an engine compartment 17 housing an engine area, including an engine 18 and a hydraulic system 20, among other things. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. The spray system 24 can include storage containers such as rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

Figure 2:
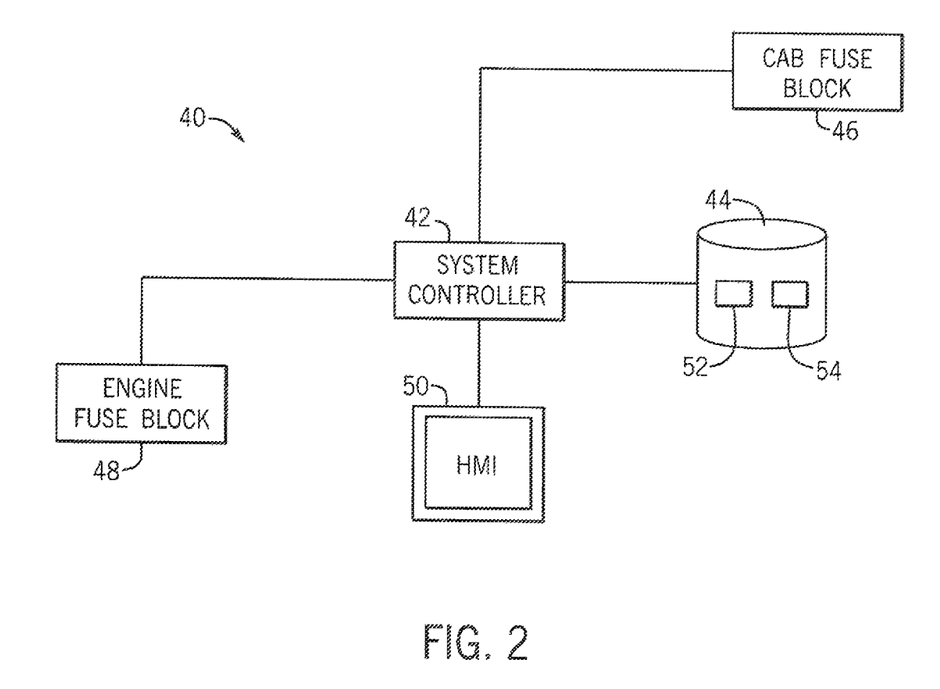
FIG. 2 is block diagram of a fault detection system in accordance with an aspect of the invention which can be implemented with respect to an agricultural machine, such as the machine of FIG. 1.

Referring now to FIG. 2, a block diagram of a fault detection system 40, which can be implemented with respect to the sprayer 10, is provided in accordance with an aspect of the invention. The fault detection system 40 can include a system controller 42 in communication with a data structure 44, a first fuse block 46, a second fuse block 48, and a Human Machine Interface (HMI) 50, among other things. The system controller 42 can be a microprocessor, a microcontroller or other programmable logic element configured to execute a program 52 stored in the data structure 44 which can be a non-transient medium as known the art. The first fuse block 46 can include multiple electrical fuses and/or relays for protecting equipment corresponding to the operator cab 16, such as cab lighting, exterior lighting, windshield wipers, door alarms, powered seats, powered mirrors, a Heating, Ventilation and Air Conditioning (HVAC) system, battery combiner logic, and the like. The first fuse block 46 could be located, for example, in the operator cab 16, such as under a storage bin behind a training seat in the operator cab 16, with the multiple electrical fuses and/or relays of the first fuse block 46 being arranged in a first physical pattern, orientation or layout under a protective cover. The second fuse block 48 can include multiple electrical fuses and/or relays for protecting equipment corresponding to the engine area, such as the power the boom 30, the lift assembly 32, a powered foamer, product dispensing and/or boom valves, an alternator, engine auxiliary power, and the like. The second fuse block 48 could be located, for example, in the engine compartment 17, such as behind an access panel on a side of the engine compartment 17, with the multiple electrical fuses and/or relays of the second fuse block 48 being arranged in a second physical pattern, orientation or layout, different from the first physical pattern, under a protective cover. The first and second fuse block 46 and 48, respectively, can also include spare fuses and/or relays for replacing faulty fuses and/or relays, respectively. The system controller 42 can communicate with the first and second fuse blocks 46 and 48, respectively, for example, via a Controller Area Network (CAN bus) or other vehicle bus system. The HMI 50 can be a touchscreen in the operator cab 16 for displaying screen pages and receiving commands from an operator.

In accordance with an aspect of the invention, the system controller 42 can execute to reference a library 54 in the data structure 44 containing physical layout information for displaying virtual representations of the aforementioned fuse blocks to the screen of the HMI 50. The virtual representations can show the arrangements of the electrical fuses and/or relays in the same physical patterns, layouts or orientations as provided on the actual machine. This can advantageously allow an operator to quickly assess a location of a fuse or relay, such as for replacement. In addition, the system controller 42 can monitor the fuses and/or relays for a fault condition, such as a blown fuse or relay that is no longer conducting electricity, and upon detection of such a fault condition, provide a pop-up screen to alert the operator, and/or highlight the fuse or relay producing the fault condition in the virtual representation.

Figure 3:
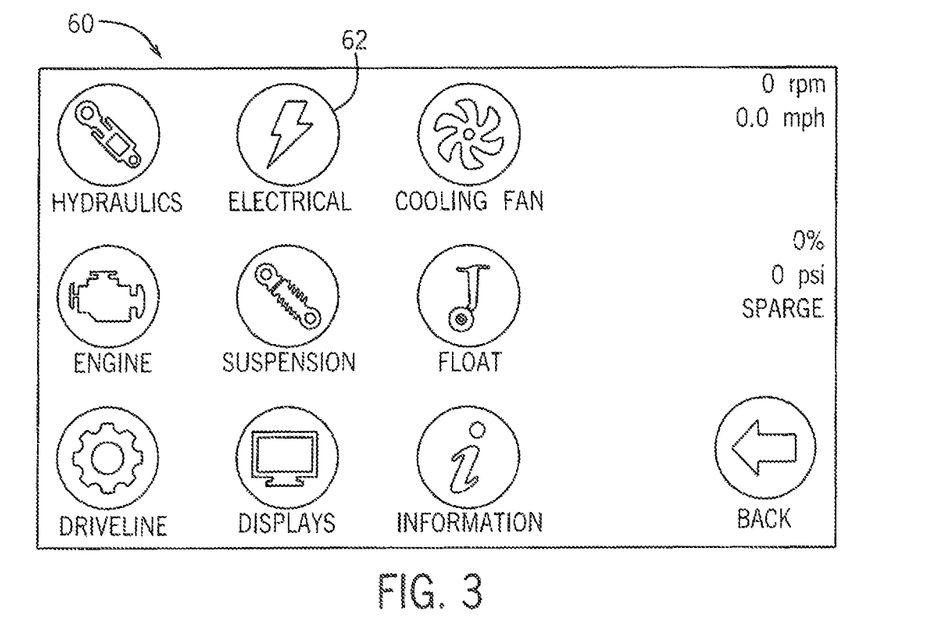
FIG. 3 is an exemplar home screen page which can be displayed in the fault detection system of FIG. 2.
Figure 4:
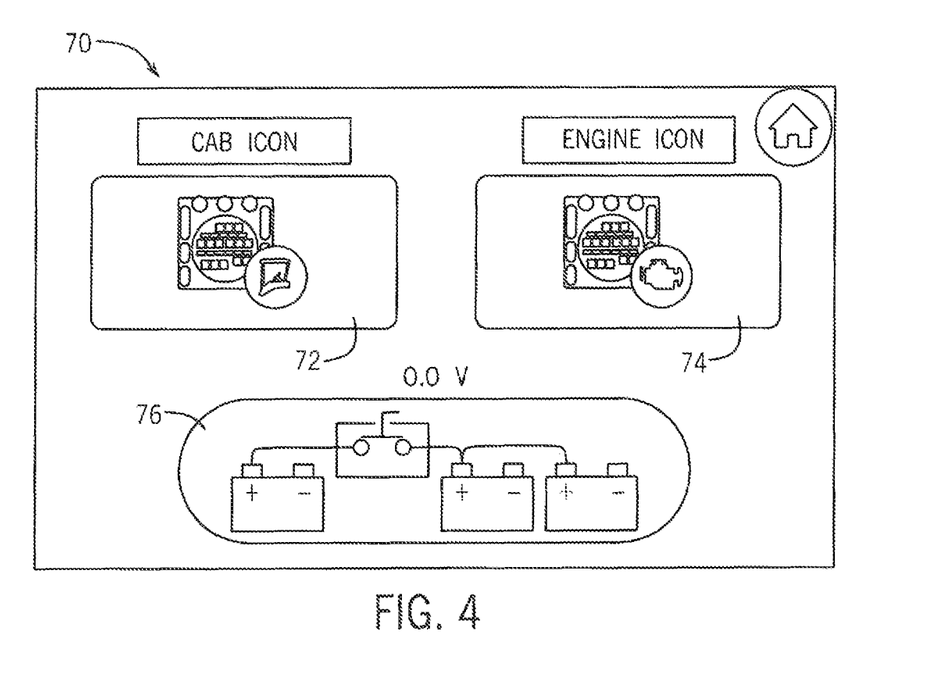
FIG. 4 is an exemplar electrical screen page which can be selected from the home screen page of FIG. 3.

By way of example, with additional reference to FIG. 3, the system controller 42 can execute to display a home screen page 60 to the HMI 50. Selection of an icon on the home screen page 60 by a user can operate to navigate the user to another screen page with additional corresponding information. Icons on the home screen page 60 can include, for example, hydraulics, electrical, cooling fan, engine, suspension, float, driveline, displays and/or information. With additional reference to FIG. 4, selection of an electrical icon 62 on the home screen page 60 can navigate the user to an electrical screen page 70 for more detailed information about the electrical system of the sprayer 10. At the electrical screen page 70, the user can select, for example, a cab fuse icon 72 for obtaining more information with respect to the first fuse block 46, or an engine icon 74 for obtaining more information with respect to the second fuse block 48. The electrical screen page 70 can also provide battery combiner status information, such as by way of a battery combiner icon 76.

Figure 5:
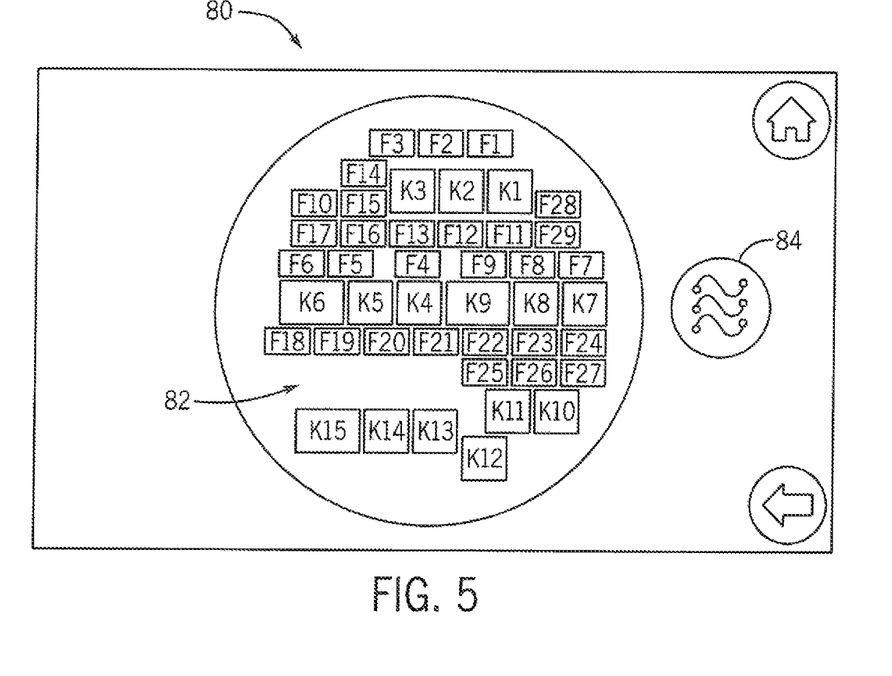
FIG. 5 is an exemplar screen page illustrating a first virtual representation of a first fuse block, such as fuses corresponding to the cab, which can be selected from the electrical screen page of FIG. 4.

With additional reference to FIG. 5, selection of the cab fuse icon 72 on the electrical screen page 70 can navigate the user to a first fuse block screen page 80 for more detailed information about the first fuse block 46 of the sprayer 10. The first fuse block screen page 80 can provide a first virtual representation 82 of the first fuse block 46 having the electrical fuses (illustrated with "F" prefixes) and relays (illustrated with "K" prefixes) as arranged in the first physical pattern. For example, as shown in FIG. 5, the first virtual representation 82 can show the first fuse block 46 being physically arranged in a generally circular pattern with three fuses, "F1," "F2," and "F3," generally aligned in a top row, with subsequent rows of fuses and/or relays in offset arrangements and varying counts. In addition, also with reference to FIG. 6, selection of the cab fuse list icon 84 on the first fuse block screen page 80 can navigate the user to a first fuse block list screen page 90 for displaying a list corresponding to the fuses and/or relays of the first fuse block 46 (and the first virtual representation 82). The list can provide detailed descriptions for each of the fuses and/or relays, preferably in numeric order, such as "F1" being for stadium lights 1 and 6 in the operator cab 16, "F2" being for stadium lights 2 and 5 in the operator cab 16, and "F3" being for stadium lights 3 and 5 in the operator cab 16. The system controller 42 can reference the library 54 for the aforementioned descriptions.

Figure 7:
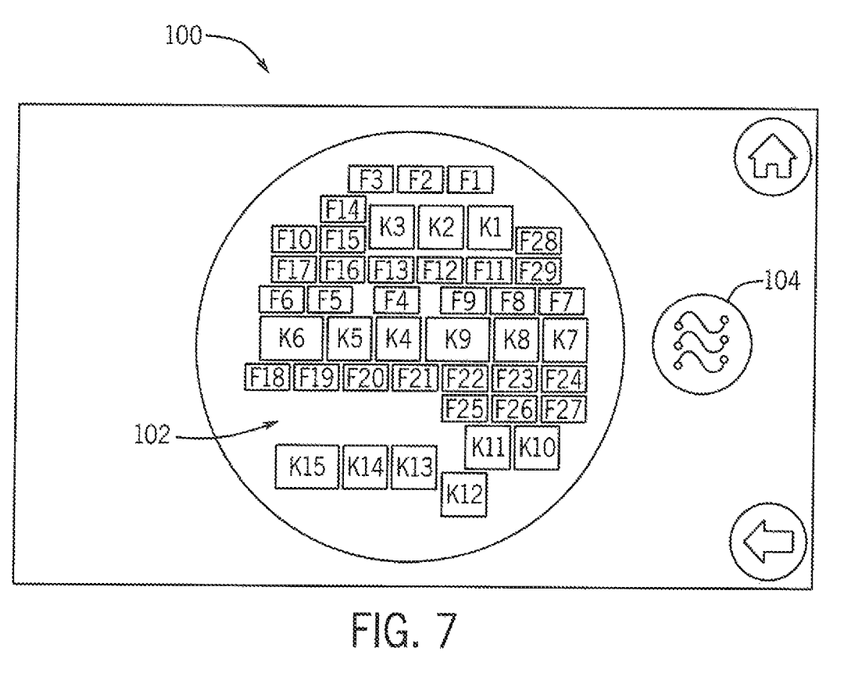
FIG. 7 is an exemplar screen page illustrating a second virtual representation of a second fuse block, such as fuses corresponding to the engine area, which can be selected from the electrical screen page of FIG. 4.
Figure 8:
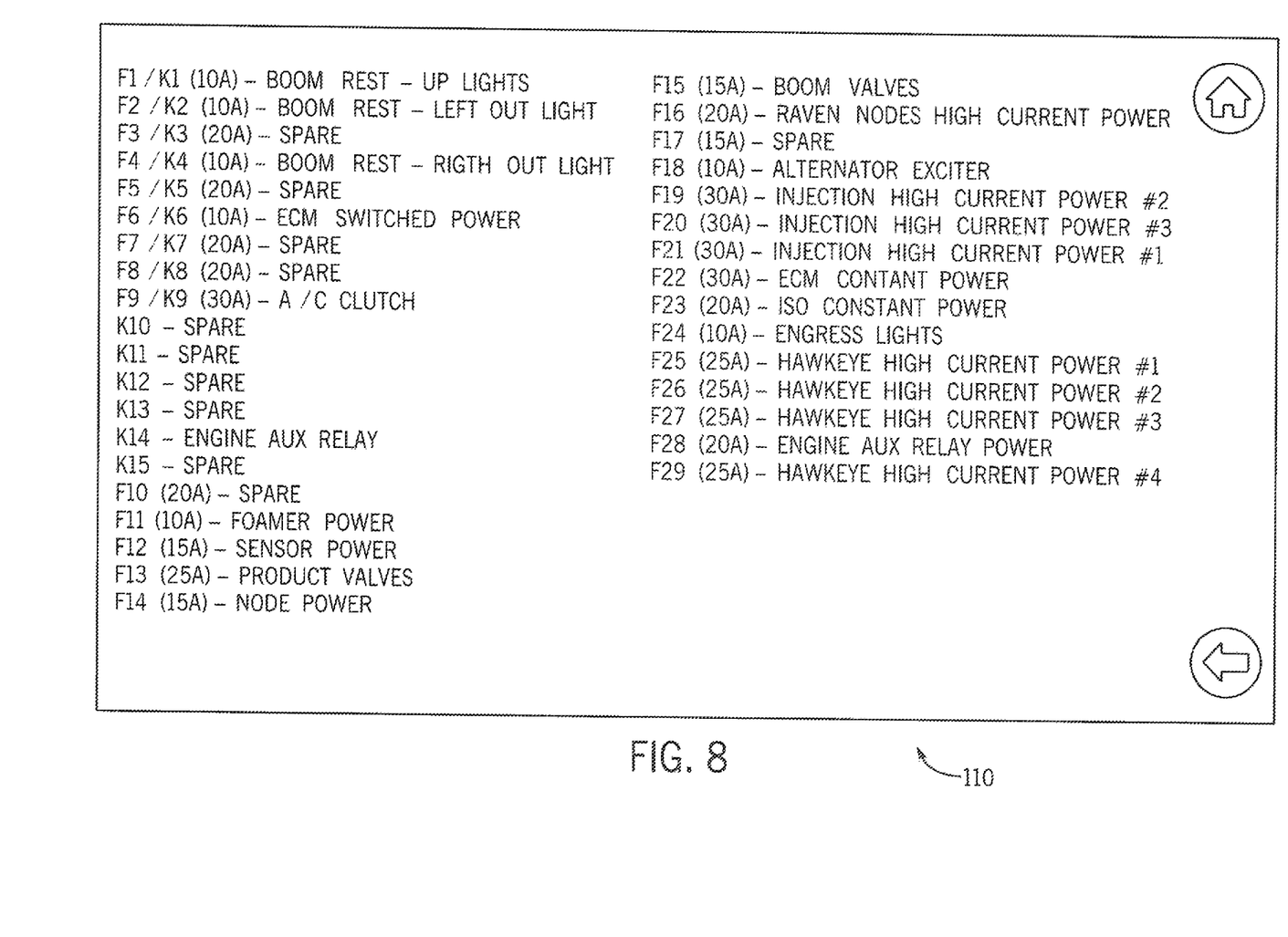
FIG. 8 is an exemplar list screen page which can be displayed to provide descriptions for the electrical fuses of the second virtual representation of FIG. 6.

Similarly, with additional reference to FIG. 7, selection of the engine icon 74 on the electrical screen page 70 (FIG. 4) can navigate the user to a second fuse block screen page 100 for more detailed information about the second fuse block 48 of the sprayer 10. The second fuse block screen page 100 can provide a second virtual 102 of the second fuse block 48 having the electrical fuses (also illustrated with "F" prefixes) and relays (also illustrated with "K" prefixes) as arranged in the second physical pattern. For example, as shown in FIG. 7, the second virtual representation 102 can show the second fuse block 48 being physically arranged in a generally circular pattern with three fuses, "F1," "F2," and "F3," generally aligned in a top row, with subsequent rows of fuses and/or relays in offset arrangements and varying counts. However, differences between the first and second virtual representations 82 and 102, respectively, can be present, which differences would be consistent with the physical patterns of the first and second fuse blocks 46 and 48, respectively. In addition, also with reference to FIG. 8, selection of the engine fuse list icon 104 on the second fuse block screen page 100 can navigate the user to a second fuse block list screen page 110 for displaying a list corresponding to the fuses and/or relays of the second fuse block 48 (and the second virtual representation 102). The list can provide detailed descriptions for each of the fuses and/or relays, preferably in numeric order, such as "F1" being for boom rest up lights, "F2" being for boom rest up left lights, and "F3" being a spare fuse. The system controller 42 can reference the library 54 for the aforementioned descriptions.

Figure 6:
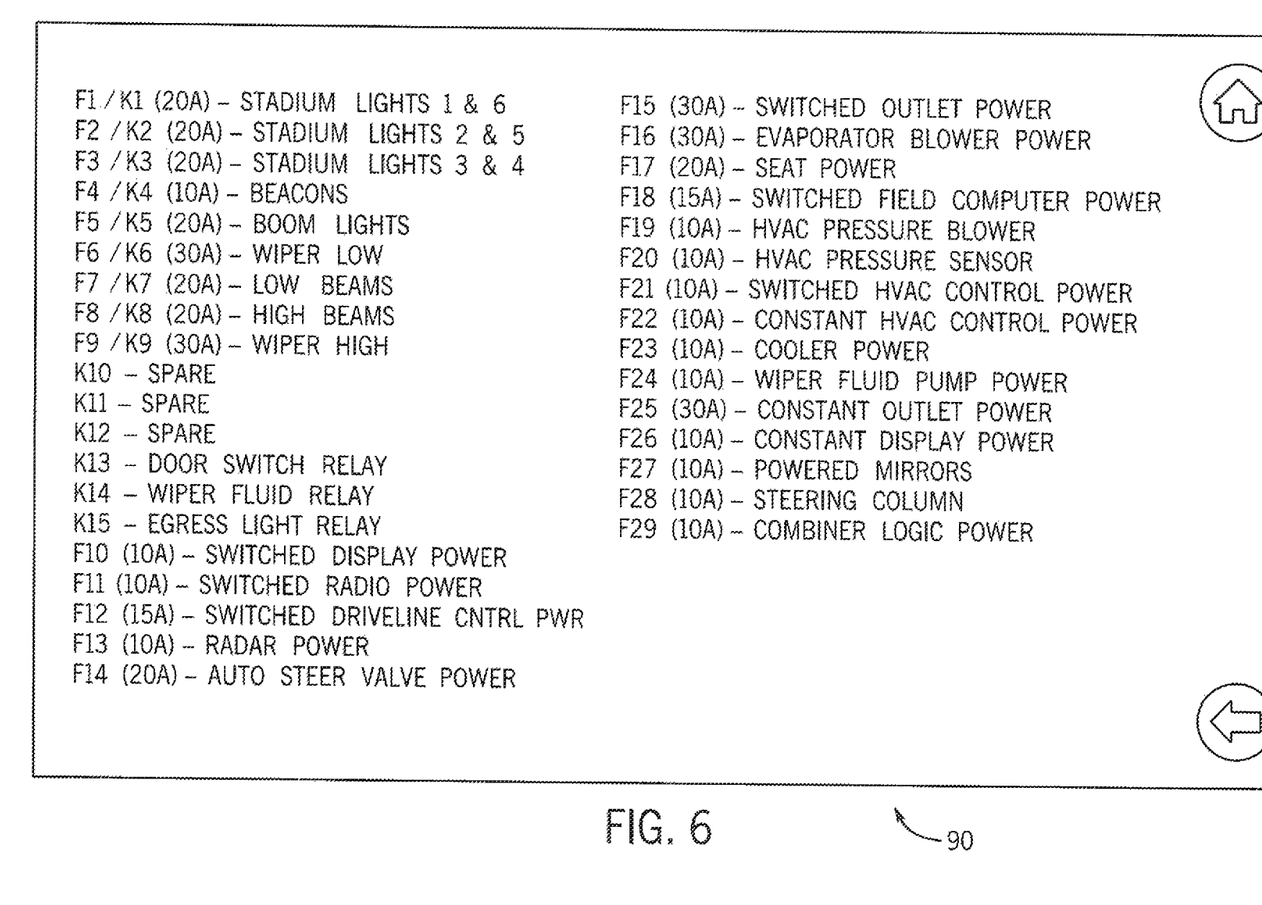
FIG. 6 is an exemplar list screen page which can be displayed to provide descriptions for the electrical fuses of the first virtual representation of FIG. 5.
Figure 9:
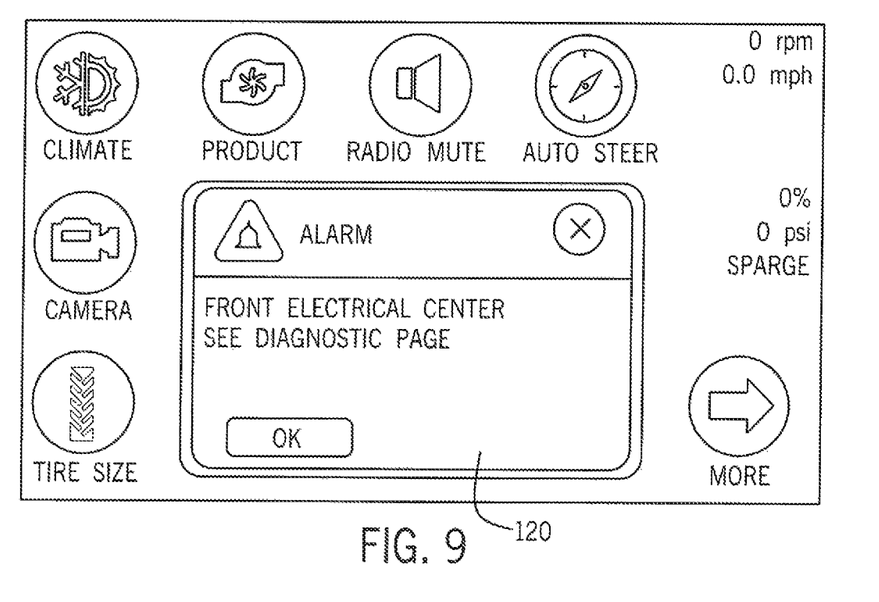
FIG. 9 is an exemplar pop-up screen which can be displayed over a screen page to indicate detection of a fault condition.
Figure 10:
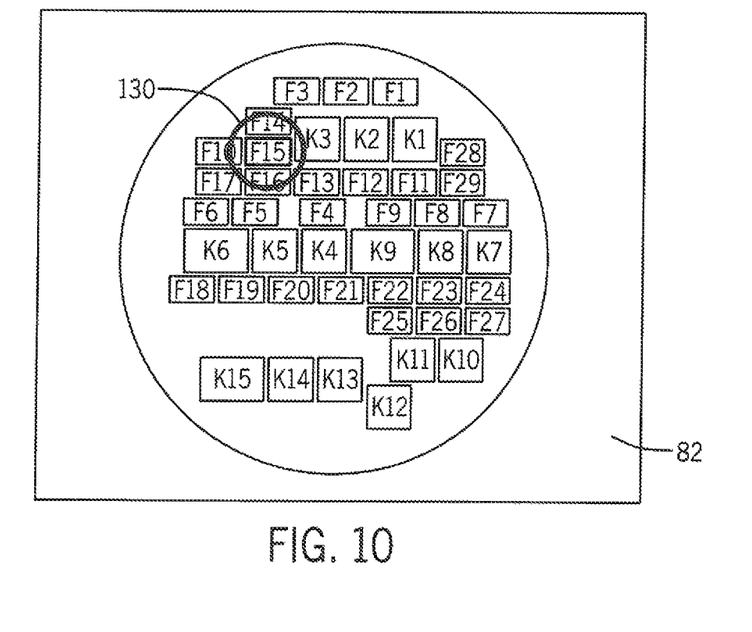
FIG. 10 is the fuse block screen page of FIG. 5 in which the fault detection system highlights an exemplar electrical fuse as producing a fault condition.

During operation of the sprayer 10, the system controller 42 can execute to monitor the aforementioned fuses and/or relays for a fault condition in which a fuse and/or relay fails to operate. With additional reference to FIG. 9, upon the system controller 42 detecting a fuse and/or relay failing to operate, such as a blown fuse and/or relay that is no longer conducting electricity, the system controller 42 can display a pop-up screen 120 to the HMI 50. This can serve to immediately bring the fault condition to the user's attention, and allow the user to further assess the fault condition, such as via the electrical screen page 70, the first fuse block screen page 80, and/or the second fuse block screen page 100, at the user's discretion. In addition, system controller 42 can execute to highlight the fuse and/or relay producing the fault condition in the virtual representation of the fuse block displayed to the HMI. For example, with additional reference to FIG. 10, if the fuse "F15" in the first fuse block 46 produced the fault condition, when viewing the first virtual representation 82 of the first fuse block 46 via the HMI 50, an icon for the fuse "F15" will change to the color red, thereby highlighting the fault condition with respect to that fuse. Moreover, the use can then select the cab fuse list icon 84 to determine that the faulty fuse, "F15." corresponds to switched outlet power (FIG. 6).

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

I claim:

1. A fault detection system for an agricultural machine comprising:
   a fuse block comprising a plurality of electrical fuses for protecting equipment of the agricultural machine, the plurality of electrical fuses are grouped together in the fuse block in a physical pattern at predetermined physical locations;
   a Human Machine Interface (HMI) having a screen; and
   a system controller in communication with the fuse block and the HMI, the system controller executing a program stored in a non-transient medium operable to:
   (a) display to the HMI a virtual representation of each of the electrical fuses of the plurality of electrical fuses of the fuse block in the physical pattern such that each electrical fuse of the plurality of electrical fuses is depicted in a corresponding predetermined physical location in the fuse block relative to the predetermined physical locations of the other of the plurality of electrical fuses in the fuse block;
   (b) monitor the plurality of electrical fuses for a fault condition in which an electrical fuse fails to operate; and
   (c) upon detection of an electrical fuse producing a fault condition, highlight the electrical fuse producing the fault condition in the virtual representation of the fuse block displayed to the HMI.

2. The fault detection system of claim 1, wherein the system controller is further operable to display to the HMI a list corresponding to the plurality of electrical fuses, wherein the list provides descriptions for the electrical fuses.

3. The fault detection system of claim 1, wherein the system controller is operable to highlight the electrical fuse producing the fault condition by changing a color of the electrical fuse in the virtual representation.

4. The fault detection system of claim 1, wherein the system controller is further operable to display a pop-up screen to the HMI upon detection of a fault condition.

5. The fault detection system of claim 1, wherein the fuse block further comprises a plurality of electrical relays arranged in the physical pattern, and the system controller is operable to display to the HMI the virtual representation of the fuse block with the plurality of electrical relays in the physical pattern.

6. The fault detection system of claim 1, wherein the fuse block is a first fuse block for a first part of the agricultural machine, and further comprising a second fuse block for a second part of the agricultural machine, wherein the system controller is further operable to execute steps (a)-(c) for the second fuse block.

7. A fault detection system for an agricultural machine comprising:
   a fuse block comprising a plurality of electrical fuses for protecting equipment of the agricultural machine, wherein the electrical fuses are arranged in the fuse block in a physical pattern;
   a Human Machine Interface (HMI) having a screen; and
   a system controller in communication with the fuse block and the HMI, the system controller executing a program stored in a non-transient medium operable to:
      (a) display to the HMI a virtual representation of the fuse block having the plurality of electrical fuses arranged in the physical pattern;
      (b) monitor the plurality of electrical fuses for a fault condition in which an electrical fuse fails to operate; and
      (c) upon detection of an electrical fuse producing a fault condition, highlight the electrical fuse producing the fault condition in the virtual representation of the fuse block displayed to the HMI;
   wherein:
      the fuse block is a first fuse block for a first part of the agricultural machine, and further comprising a second fuse block for a second part of the agricultural machine;
      the system controller is further operable to execute steps (a)-(c) for the second fuse block; and
      the first fuse block is configured to protect equipment corresponding to a cab of the agricultural machine, and the second fuse block is configured to protect equipment corresponding to an engine area of the agricultural machine.

8. The fault detection system of claim 1, wherein the screen is a touchscreen.

9. A method for detecting faults in an agricultural machine having a fuse block comprising a plurality of electrical fuses for protecting equipment of the agricultural machine, the electrical fuses grouped together in the fuse block in a physical pattern at predetermined physical locations, the method comprising:
   (a) displaying to a Human Machine Interface (HMI) having a screen a virtual representation of the plurality of electrical fuses grouped together in the physical pattern in the fuse block, such that each electrical fuse of the plurality of electrical fuses depicted in a corresponding predetermined physical location in the fuse block relative to the predetermined physical locations of the other of the plurality of electrical fuses in the fuse block;
   (b) monitoring the plurality of electrical fuses for a fault condition in which an electrical fuse fails to operate; and
   (c) upon detecting an electrical fuse producing a fault condition, highlighting the electrical fuse producing the fault condition in the virtual representation of the fuse block displayed to the HMI.

10. The method of claim 9, further comprising displaying to the HMI a list corresponding to the plurality of electrical fuses, wherein the list provides descriptions for the electrical fuses.

11. The method of claim 9, further comprising highlighting the electrical fuse producing the fault condition by changing a color of the electrical fuse in the virtual representation.

12. The method of claim 9, further comprising displaying a pop-up screen to the HMI upon detection of a fault condition.

13. The method of claim 9, further comprising displaying in the virtual representation a plurality of electrical relays arranged in the physical pattern.

14. The method of claim 9, wherein the fuse block is a first fuse block for a first part of the agricultural machine, and further comprising a second fuse block for a second part of the agricultural machine.

15. A method for detecting faults in an agricultural machine having a fuse block comprising a plurality of electrical fuses for protecting equipment of the agricultural machine, wherein the electrical fuses are arranged in the fuse block in a physical pattern, the method comprising:
   (a) displaying to a Human Machine Interface (HMI) having a screen a virtual representation of the fuse block having the plurality of electrical fuses arranged in the physical pattern;
   (b) monitoring the plurality of electrical fuses for a fault condition in which an electrical fuse fails to operate; and
   (c) upon detecting an electrical fuse producing a fault condition, highlighting the electrical fuse producing the fault condition in the virtual representation of the fuse block displayed to the HMI;
   wherein:
      the fuse block is a first fuse block for a first part of the agricultural machine, and further comprising a second fuse block for a second part of the agricultural machine; and
      the first fuse block corresponding to a cab of the agricultural machine, and the second fuse block corresponding to an engine area of the agricultural machine.

16. The fault method of claim 9, wherein the screen is a touchscreen.

17. An agricultural sprayer comprising:
   a chassis supported by a plurality of wheels, the chassis supporting an engine, a drive system, a lift arm assembly and an operator cab;
   a sprayer boom connected to the lift arm assembly;
   a first fuse block comprising a plurality of electrical fuses for protecting equipment corresponding to the cab, wherein the electrical fuses of the first fuse block are arranged in a first physical pattern;
   a second fuse block comprising a plurality of electrical fuses for protecting equipment corresponding to the engine area, wherein the electrical fuses of the second fuse block are arranged in a second physical pattern;

a Human Machine Interface (HMI) having a touchscreen in the operator cab; and a system controller in communication with the first and second fuse blocks and the HMI, the system controller executing a program stored in a non-transient medium operable to:

(a) display to the HMI first and second virtual representations of the first and second fuse blocks having the plurality of electrical fuses arranged in the first and second physical patterns, respectively;

(b) monitor the plurality of electrical fuses of the first and second fuse blocks for a fault condition in which an electrical fuse fails to operate; and (c) upon detection of an electrical fuse producing a fault condition, highlight the electrical fuse producing the fault condition in a corresponding virtual representation of the first or second fuse blocks displayed to the HMI.

18. The agricultural sprayer of claim 17, wherein the system controller is further operable to display to the HMI first and second lists corresponding to electrical fuses of the first and second fuse blocks, respectively, wherein the first and second lists each provide descriptions for electrical fuses.

19. The agricultural sprayer of claim 17, wherein the system controller is operable to highlight an electrical fuse producing a fault condition by changing a color of the electrical fuse in the first or second virtual representation.

20. The agricultural sprayer of claim 17, wherein the system controller is further operable to display a pop-up screen to the HMI upon detection of a fault condition.

* * * * *